United States Patent
Hagiwara et al.

(10) Patent No.: US 7,378,189 B2
(45) Date of Patent: May 27, 2008

(54) ELECTRODE MATERIAL FOR LITHIUM SECONDARY BATTERY, ELECTRODE STRUCTURE EMPLOYING ELECTRODE MATERIAL, AND LITHIUM SECONDARY BATTERY HAVING ELECTRODE STRUCTURE

(75) Inventors: Kazunari Hagiwara, Shizuoka (JP); Soichiro Kawakami, Kanagawa (JP); Nobuyuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/851,069

(22) Filed: May 24, 2004

(65) Prior Publication Data

US 2005/0003273 A1    Jan. 6, 2005

(30) Foreign Application Priority Data

May 30, 2003    (JP) .............................. 2003-155220

(51) Int. Cl.
*H01M 4/58* (2006.01)
*H01M 4/00* (2006.01)

(52) U.S. Cl. .............................. 429/231.1; 429/231.2; 429/231.3; 429/231.5; 429/219; 429/220; 429/221; 429/223; 429/224; 429/229

(58) Field of Classification Search ............ 429/231.1, 429/231.2, 231.3, 231.5, 219, 220, 221, 223, 429/224, 229
See application file for complete search history.

(56) References Cited

U.S. PATENT DOCUMENTS

| | | | |
|---|---|---|---|
| 5,491,037 A | 2/1996 | Kawakami | 429/49 |
| 5,620,812 A * | 4/1997 | Tahara et al. | 429/224 |
| 5,641,591 A | 6/1997 | Kawakami et al. | 429/218 |
| 5,658,689 A | 8/1997 | Kawakami et al. | 429/194 |
| 5,681,394 A | 10/1997 | Suzuki | 118/723 |
| 5,698,339 A | 12/1997 | Kawakami et al. | 429/212 |
| 5,702,845 A | 12/1997 | Kawakami et al. | 429/224 |
| 5,728,482 A | 3/1998 | Kawakami et al. | 429/10 |
| 5,800,939 A | 9/1998 | Mishina et al. | 429/57 |
| 5,824,434 A | 10/1998 | Kawakami et al. | 429/209 |
| 5,882,811 A | 3/1999 | Kawakami | 429/49 |
| 5,888,666 A | 3/1999 | Kawakami | 429/62 |
| 5,919,589 A | 7/1999 | Kawakami et al. | 429/231.8 |
| 5,989,744 A | 11/1999 | Yamaura | 429/223 |
| 5,998,063 A | 12/1999 | Kobayashi et al. | 429/218.1 |
| 6,051,340 A | 4/2000 | Kawakami et al. | 429/231.95 |

(Continued)

FOREIGN PATENT DOCUMENTS

EP    1 032 061 A1    8/2000

(Continued)

*Primary Examiner*—Laura S Weiner
(74) *Attorney, Agent, or Firm*—Fitzpatrick, Cella, Harper & Scinto (57) ABSTRACT

The present invention provides: an electrode material for a lithium secondary battery containing lithium boron mixed oxide having a monoclinic $LiBO_2$ structure and represented by a chemical formula $LiB_{1-x}D_xO_{2-y}E_y$ (wherein, D represents a substitution element of boron B, E represents a substitution element of oxygen O, $0<x<0.5$, and $0 \leq y<0.1$); an electrode structure employing the electrode material; and a lithium secondary battery having the electrode structure. Accordingly, the present invention provides: an electrode material for a lithium secondary battery having a voltage of 3.0 V (vs. $Li/Li^+$) or more, a usable capacity exceeding 200 mAh/g, and a high energy density; an electrode structure employing the electrode material; and a lithium second battery having the electrode structure.

12 Claims, 5 Drawing Sheets

U.S. PATENT DOCUMENTS

| | | | |
|---|---|---|---|
| 6,063,142 A | 5/2000 | Kawakami et al. | 29/623.5 |
| 6,165,642 A | 12/2000 | Kawakami et al. | 429/218.1 |
| 6,329,096 B2 | 12/2001 | Kawakami et al. | 429/49 |
| 6,372,387 B1 | 4/2002 | Kawakami et al. | 429/303 |
| 6,377,030 B1 | 4/2002 | Asao et al. | 320/161 |
| 6,432,585 B1 | 8/2002 | Kawakami et al. | 429/233 |
| 6,475,664 B1 | 11/2002 | Kawakami et al. | 429/137 |
| 6,517,974 B1 | 2/2003 | Kobayashi et al. | 429/231.95 |
| 6,558,847 B1 | 5/2003 | Kawakami et al. | 429/231.95 |
| 6,558,848 B1 | 5/2003 | Kobayashi et al. | 429/241 |
| 6,569,568 B2 | 5/2003 | Kobayashi et al. | 429/221 |
| 6,596,432 B2 | 7/2003 | Kawakami et al. | 429/60 |
| 6,638,322 B1 | 10/2003 | Kawakami et al. | 29/623.1 |
| 6,649,304 B2 | 11/2003 | Tani et al. | 429/223 |
| 6,656,638 B1 | 12/2003 | Yamaura | 429/231.95 |
| 6,730,434 B1 | 5/2004 | Kawakami et al. | 429/218.1 |
| 2002/0015889 A1 | 2/2002 | Yamamoto et al. | 429/231.95 |
| 2002/0124386 A1 | 9/2002 | Hosoya et al. | 29/623.1 |
| 2002/0197530 A1 | 12/2002 | Tani et al. | 429/218.2 |
| 2003/0143464 A1 | 7/2003 | Yamamoto et al. | 429/231.95 |
| 2003/0157407 A1 | 8/2003 | Kosuzu et al. | 429/231.95 |
| 2004/0175618 A1 | 9/2004 | Inoue et al. | 429/231.1 |
| 2004/0191630 A1 | 9/2004 | Kawamura et al. | 429/224 |

FOREIGN PATENT DOCUMENTS

| | | |
|---|---|---|
| JP | 5-325971 | 12/1993 |
| JP | 10-50314 | 2/1998 |
| JP | 2000-243394 | 9/2000 |
| JP | 2000-251887 | 9/2000 |
| JP | 2002-117848 | 4/2002 |

\* cited by examiner

ELECTRODE MATERIAL FOR LITHIUM SECONDARY BATTERY, ELECTRODE STRUCTURE EMPLOYING ELECTRODE MATERIAL, AND LITHIUM SECONDARY BATTERY HAVING ELECTRODE STRUCTURE

BACKGROUND OF THE INVENTION

1. Field of the Invention

The present invention relates to an electrode material for a lithium secondary battery, an electrode structure employing the electrode material, and a lithium secondary battery having the electrode structure.

2. Related Background Art

Recently, an amount of a $CO_2$ gas in air has increased leading to a green house effect, and global warming caused by the green house effect has become a concern. Countermeasures for reducing the amount of $CO_2$ gas emission have been studied globally. For example, thermal power plants, which convert thermal energy obtained by burning fossil fuel into electric energy, exhaust a large amount of the $CO_2$ gas. Thus, construction of additional thermal power plants has become difficult. Therefore, so-called load leveling has been proposed for effective use of electric power to meet an increasing electric power demand. That is, the electric power generated at night, which is surplus power, is stored in secondary batteries installed in general households. The stored electric power is used during daytime when consumption of the electric power increases, to thereby level load distribution. Aside from this, vehicles which run on fossil fuel exhaust NOx, SOx, hydrocarbons, or the like in addition to $CO_2$, and such vehicles are perceived as a problem as another source of air pollutants. Electric vehicles which run by driving a motor by electricity stored in the secondary batteries have attracted attention from a view of reducing the source of air pollutants, because the electric vehicles do not exhaust air pollutants. Research and development on such electrical vehicles have been actively promoted for an early practical application. High energy density, long-life, and low cost secondary batteries have been demanded for their use in load leveling applications and electrical vehicles.

Further, early provision of small, lightweight, and high performance secondary batteries is strongly urged for their use as power supply of portable equipment such as laptop personal computers, word processors, video cameras, and cellular phones.

Various high performance secondary batteries which meet the demands described above have been proposed, and some thereof are in practical use. A typical constitution of the lithium batteries in practical use employs a carbon material for a negative electrode, a lithium-cobalt mixed oxide ($LiCoO_2$) for a positive electrode, and an ethylene carbonate electrolyte. The lithium-cobalt mixed oxide used as the positive electrode material (positive electrode active material) has a high theoretical capacity of 280 mAh/g and a low usable capacity of 160 mAh/g. In addition, $LiNiO_2$ and $LiMn_2O_4$ known as the positive electrode materials respectively have low usable capacities of 190 mAh/g and 150 mAh/g, similar to that of the lithium-cobalt mixed oxide. The positive electrode materials have a voltage of 3.0 V (vs. $Li/Li^+$) or more but have a practically usable capacity of 200 mAh/g or less, which is insufficient. The expression "(vs. $Li/Li^+$)" shows a voltage with respect to lithium.

In addition, as the positive electrode materials having a voltage of 3.0 V (vs. $Li/Li^+$) or more, olivine materials have been proposed. For example, Japanese Patent Application Laid-Open No. 2002-117848 discloses $LiFePO_4$ having an olivine structure and substituting a part of Fe by Cu, Ni, V, Mo, Ti, Zn, Al, Ga, Mg, B, Nb, Co, Mn, or Cr, as a positive electrode material of a secondary battery. However, those materials have a usable capacity not exceeding 200 mAh/g.

Further, Japanese Patent Application Laid-Open No. H05-325971 discloses $LiB_xCo_{1-x}O_2$ ($0.001 \leq x \leq 0.25$), which is $LiCoO_2$ having a part of cobalt substituted with boron B, as a positive electrode material of a secondary battery. Those materials have an $\alpha$-$NaFeO_2$ structure, and thus a discharge capacity of the first charging and discharging cycle decreases with increasing boron B content at $x \geq 0.1$. At $x=0.3$, the discharge capacity is lower than that of the first charging and discharging cycle at $x=0$. Thus, the positive electrode material disclosed in Japanese Patent Application Laid-Open No. H05-325971 has a low usable capacity and an unsatisfactory energy density.

In addition, as the positive electrode materials of secondary batteries, $LiMO_2$ (M represents Co or Ni) having an $\alpha$-$NaFeO_2$ structure is known. Those materials have a high theoretical capacity of 280 mAh/g, but low usage capacities of 160 mAh/g (when M=Co) and 190 mAh/g (when M=Ni). In addition, $LiMn_2O_4$ having a spinel structure is known, but the material has a low theoretical capacity of 150 mAh/g.

As described above, many materials have been provided conventionally as a positive electrode material (positive electrode active material) of a secondary battery (that is, lithium secondary battery). However, none of the materials is satisfactory particularly regarding the practically usable capacity. That is, a positive electrode material (positive electrode active material) having a voltage of 3.0 V (vs. $Li/Li^+$) or more, a practically usable capacity exceeding 200 mAh/g, and a high energy density has not been found yet. Thus, early provision of such positive electrode materials is strongly urged.

SUMMARY OF THE INVENTION

The present invention has been made in view of the above, and an object of the present invention is therefore to provide a positive electrode material (positive electrode active material) having a voltage of 3.0 V (vs. $Li/Li^+$) or more, a usable capacity exceeding 200 mAh/g, and a high energy density. That is, an object of the present invention is to provide an electrode material for a lithium secondary battery containing the positive electrode material. Further, another object of the present invention is to provide an electrode structure for a lithium secondary battery employing the electrode material, and a lithium secondary battery having a positive electrode composed of the electrode structure.

The inventors of the present invention have devoted themselves in research for solving the above problems and attaining the above objects. Intercalation and deintercalation (occlusion and release) of lithium which does not vary a valence requires valence variation of an element other than lithium, but it has been known that boron and oxygen substantially do not have varying valences. In view of this point, the inventors of the present invention have assumed that a portion corresponding to one element of lithium (Li) of the monoclinic $LiBO_2$ can contribute to charging and discharging, and have focused on electrochemically inert monoclinic $LiBO_2$, which has a high theoretical capacity of 540 mAh/g but is unable to charge and discharge in actuality. The inventors substituted a part of boron of the monoclinic $LiBO_2$ with a specific element or a part of oxygen of the monoclinic $LiBO_2$ with a specific element. The obtained material was found to be capable of intercalating and deintercalating lithium and have a voltage of 3.0 V (vs. Li/Li$^+$) or more, a usable capacity exceeding 200 mAh/g, and a high energy density, to thereby be useful as the positive electrode active material. Further, a lithium secondary battery produced by actually employing the material as the positive electrode active material had a high capacity, a high energy density, and excellent charging and discharging characteristics. The present invention is based on the above findings.

Therefore, the present invention provides an electrode material for a lithium secondary battery containing lithium boron mixed oxide having a monoclinic LiBO$_2$ structure and represented by a chemical formula LiB$_{1-x}$D$_x$O$_{2-y}$E$_y$ (wherein, D represents a substitution element of boron B, E represents a substitution element of oxygen O, 0<x<0.5, and 0≦y<0.1).

Further, the present invention provides an electrode structure employing an electrode material for a lithium secondary battery, in which the electrode material contains lithium boron mixed oxide having a monoclinic LiBO$_2$ structure and represented by a chemical formula LiB$_{1-x}$D$_x$O$_{2-y}$E$_y$ (wherein, D represents a substitution element of boron B, E represents a substitution element of oxygen O, 0<x<0.5, and 0≦y<0.1).

Further, the present invention provides a lithium secondary battery including at least a positive electrode, a negative electrode, and an electrolyte, in which the positive electrode employs the above electrode structure. Note that, the term lithium secondary battery refers to a concept including so-called lithium ion secondary batteries without metallic lithium.

DESCRIPTION OF THE PREFERRED EMBODIMENTS

A lithium secondary battery provided by the present invention more specifically includes at least a negative electrode, a separator, a positive electrode, and an electrolyte as an ion conductor wherein the positive electrode has a positive electrode active material capable of intercalating and deintercalating lithium ions through charging and discharging; and the positive electrode active material is mainly composed of lithium boron mixed oxide having a monoclinic LiBO$_2$ structure and represented by a chemical formula LiB$_{1-x}$D$_x$O$_{2-y}$E$_y$ (wherein, D represents a substitution element of boron B, E represents a substitution element of oxygen O, 0<x<0.5, and 0≦y<0.1).

Hereinafter, a method of acquiring an electrode material according to the present invention will be described in detail.

(Prediction Method)

A lithium compound was evaluated for material characteristics on an average voltage V (V) (vs. Li/Li$^+$) and presence stability of an electron conductive material (atomic aggregate model). A program for first principle density functional theory, CASTEP (available from Accelrys Inc.) was used to calculate the average voltage and the presence stability. The first principle density functional theory is used because total energy can be calculated by simply employing an atomic aggregate model without experimental data and because the first principle density functional theory is useful for performance prediction of materials that have an effect on interactions of electrons such as the above electrode material.

(First Principle Density Functional Theory)

The first principle density functional theory is one technique for solving Shrodinger wave equation which electron motion follows by simply assuming an atomic aggregate model without experimental parameters.

A total energy E$_{tot}$ is represented by a function of an electron density ρ in an atomic aggregate model formulated. The electron density ρ is optimized such that Etot becomes minimum self-consistently. Determination of the electron density ρ results in the determination of the total energy E$_{tot}$ and density of state.

(Calculation of Total Energy)

The total energy E$_{tot}$ is represented by the following equation (1).

$$E_{tot}=T_{electron}+U_{electron}+U_{nucleus}+U_{electron-nucleus}+E_{xc} \quad (1)$$

In the equation (1), T$_{electron}$ represents a kinetic energy of electrons, U$_{electron}$ represents a potential energy of electrons, U$_{nucleus}$ represents a potential energy of nucleus, U$_{electron-nucleus}$ represents a potential energy through an interaction between electrons and nucleus, and E$_{xc}$ represents an exchange correlation energy. Here, the exchange correlation energy E$_{xc}$ is a term for correcting the effects of an exchange interaction due to electrons following Fermi statistics and of an interaction between the electrons.

(Calculation of Voltage)

The average voltage V (V) (vs. Li/Li$^+$) of an electrode material Li$_x$M converting to an electrode material having a specific amount of lithium y through charging and discharging, that is, the average voltage V (V) through conversion from Li$_x$M to Li$_y$M, is represented by the following equation (2) where E$_{tot}$ (A) (eV) represents a total energy with respect to a material A.

$$V=\{E_{tot}(Li_xM)-E_{tot}(Li_yM)\}/e/(y-x)+E_{tot}(Li)/e \quad (2)$$

Here, e represents a charge of one electron, and E$_{tot}$(Li) represents the total energy of lithium metal. The average voltage can be calculated using the equation (2).

(Electron Conductivity Evaluation)

An electrode material must be evaluated for electron conductivity because cycle characteristics of a lithium secondary battery deteriorates with poor electron conductivity of the electrode material during charging and discharging. The electron conductivity can be roughly assumed from a width of a band gap in the vicinity of Fermi energy in the density of state. That is, a wide band gap, no band gap, and a narrow band gap respectively provide an insulator, a conductor, and a semiconductor.

(Presence Stability Evaluation)

Formation energy $E_{form}$ was used as an index for evaluating whether or not an electrode material may exist in actuality. The formation energy of a material $A_bX_y$ (b+y=1) is represented by the following equation (3).

$$E_{form}(A_bX_y)=E_{tot}(A_bX_y)-\{b\times E_{tot}(A)+y\times E_{tot}(X)\} \quad (3)$$

Here, $E_{tot}(A)$ and $E_{tot}(X)$ represent the total energies of A and X as elements.

The larger the absolute value of the negative formation energy $E_{form}$, the more likely the calculated atomic aggregate model exists in actuality.

(Search Method for Element M in Chargeable and Dischargeable $LiB_{1-x}M_xO_2$)

Figure 1:
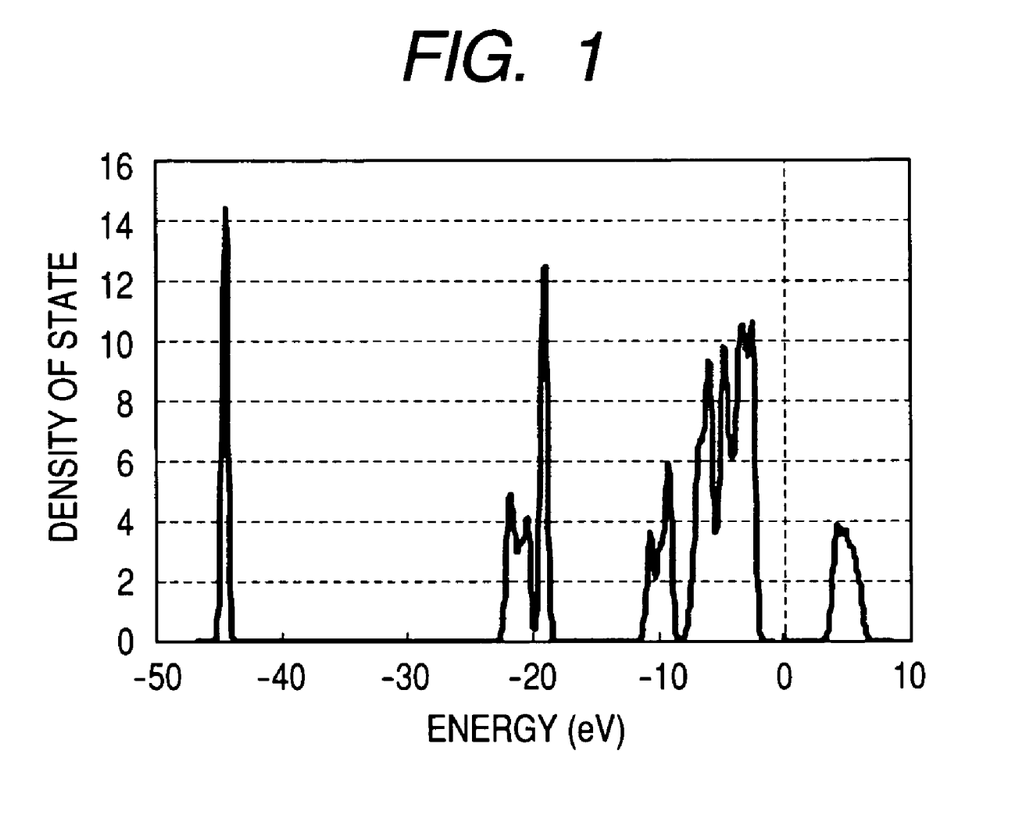
FIG. 1 is a diagram showing density of state (DOS) in accordance with energy (eV) of monoclinic LiBO$_2$ calculated using first principle density functional theory.

An element having a varying valence during intercalation and deintercalation of lithium is required to allow intercalation and deintercalation of lithium. However, boron and oxygen substantially do not have varying valences and thus monoclinic $LiBO_2$ is electrochemically inert. An assumption that lithium can be intercalated and deintercalated at an x value of 1.0 to 0.0 for the monoclinic $Li_xBO_2$ results in a high theoretical capacity of 540 mAh/g and results in a high average voltage of about 5.6 V (vs. Li/Li$^+$) between x=1.0 and x=0.0 using the total energy calculated by the first principle density functional theory. From the above, the electrode material (positive electrode material) of the present invention was found to have a high energy density. On the other hand, the monoclinic $LiBO_2$ per se has a band gap in the density of state (FIG. 1) calculated by the first principle density functional theory and has poor conductivity. Here, the origin of energy (0 eV) in FIG. 1 was referred to as Fermi energy.

The inventors of the present invention have found through the evaluation method, an electrode material (positive electrode material) capable of intercalating and deintercalating lithium and having a high capacity, a high voltage, and a high energy density. The electrode material can be obtained by substituting a part of boron in monoclinic $LiBO_2$ with a specific element or a part of oxygen therein with another specific element, for improving the conductivity of the electrode material by converting the monoclinic $LiBO_2$ into an electrochemically active material.

(Electrode Material)

As described above, the electrode material for a lithium secondary battery according to the present invention is mainly composed of lithium boron mixed oxide having a monoclinic $LiBO_2$ structure and represented by a chemical formula $LiB_{1-x}D_xO_{2-y}E_y$ (wherein, D represents a substitution element of boron B, E represents a substitution element of oxygen O, 0<x<0.5, and 0 ≦y<0.1). A value of x of 0.5 or more in the chemical formula inhibits retaining of the monoclinic $LiBO_2$ structure or significantly destabilizes the structure, thereby causing initial capacity decrease or capacity decrease after repeated charging and discharging cycles. A value of x=0 results in an electrochemically inert electrode material, which cannot intercalate or deintercalate lithium. On the other hand, a value of y of 0.1 or more in the chemical formula inhibits retaining of the monoclinic $LiBO_2$ structure or significantly destabilizes the structure, thereby causing initial capacity decrease or capacity decrease after repeated charging and discharging cycles.

The substitution element D in the above chemical formula is one or more kinds of elements selected from the group consisting of transition metal elements, Al, and Si. Similarly, the substitution element E is one or more kinds of elements selected from the group consisting of non-metal elements of Group 15, non-metal elements of Group 16, and halogens of Group 17 in the periodic table. Hereinafter, the substitution elements D and E will be described.

(Transition Metal Elements, Al, and Si)

Examples of transition metal elements of the substitution element D include elements having a partially filled d-shell or f-shell such as Ti, Zr, V, Nb, Cr, Mo, W, Mn, Fe, Co, Ni, Pd, Pt, Cu, Ag, Au, and Zn. Of the transition metal elements, first row transition metal elements, that is, Ti, V, Cr, Mn, Fe, Co, Ni, and Cu are particularly preferable. Examples of raw materials that can be used for the transition metal elements include but are limited to: transition metals of the transition metal elements; salts of the transition metal elements; oxides of the transition metal elements; and hydroxides, nitrides, sulfides, and halides of those transition metal elements. Further, examples of raw materials for Al as the substitution element D include but are not limited to aluminum metal, aluminum salts, aluminum oxides, and aluminum hydroxides. Examples of raw materials for Si as the substitution element D include but are not limited to silicon metal, silicon salts, silicon oxides, and silicon hydroxides. Typical specific examples of the salts of transition metal elements, aluminum, and silicon include carbonates, nitrates, halides, sulfates, sulfamates, acetates, oxalates, citrates, tartrates, formates, and ammonium salts.

(Non-metal Elements of Group 15)

Examples of non-metal elements of Group 15 as the substitution element E include N, P, and As. Of those, N and P are particularly preferable. Examples of raw materials for the non-metal elements of Group 15 include but are not limited to: the non-metal elements; and hydrides, halides, and oxides of the non-metal elements.

(Non-metal Elements of Group 16)

Examples of non-metal elements of Group 16 as the substitution element E include O, S, Se, and Te. Of those, O and S are particularly preferable. Examples of raw materials for the non-metal elements of Group 16 include but are not limited to: the non-metal elements; and hydrides, halides, and oxides of the non-metal elements.

(Halogens of Group 17)

Examples of halogens of Group 17 as the substitution element E include F, Cl, Br, I, and At. Of those, F and Br are particularly preferable. Examples of raw materials for the halogens of Group 17 include but are not limited to: the halogens; and hydrides and oxides of the halogens.

(Preparation Method for Electrode Material (Positive Electrode Active Material))

Hereinafter, a preparation method for an electrode material (positive electrode active material) will be described.

The electrode material can be basically prepared by: weighing a prescribed lithium compound, a prescribed boron compound, and a prescribed compound of a substitution element in a prescribed composition ratio; mixing the compounds through a prescribed mixing method; and heating and calcining the mixture at temperature in the range of 400 to 1,000° C.

Examples of the mixing method include but are not limited to: a method involving weighing the powdery lithium compound, the powdery boron compound, and the powdery compound of a substitution element in a prescribed composition ratio and dry mixing the raw materials as they are; a method involving weighing the powdery raw materials in a prescribed composition ratio, dissolving or dispersing the raw materials in an aqueous solution or an organic solvent, and scattering a water content or the organic solvent, to thereby obtain a dry homogeneous mixture; and a method involving weighing the powdery raw materials in a prescribed composition ratio, dissolving the raw materials in an acidic solution, and adding an alkali solution dropwise to the mixture, to thereby obtain a homogeneous precipitate. The above mixing methods are wet mixing methods, but dry mixing methods can also be employed.

A specific example of the wet mixing method involves: weighing a powdery prescribed lithium compound, a powdery prescribed boron compound, and a powdery prescribed compound of a substitution element in a prescribed composition ratio; dissolving or dispersing the raw materials in an aqueous solution having dissolved therein prescribed concentration of citric acid; and scattering a water content with a spray drier, to thereby obtain a dry homogeneous precursor. Instantaneous heating at temperature in the range of 400 to 1,000° C. while scattering the water content in the aqueous solution having the raw materials dissolved in the aqueous solution of citric acid is more preferable because the heating directly provides a target material.

A specific dry mixing method include a method of sufficiently mixing the raw materials using a ball mill. A more specific example of the dry mixing method involves: weighing a powdery prescribed lithium compound, a powdery prescribed boron compound, and a powdery prescribed compound of a substitution element in a prescribed composition ratio; and adding mechanical energy to the raw materials using a ball mill, to thereby uniformly mix the raw materials while forming an amorphous mixture. Calcination of the obtained amorphous mixture at temperature in the range of 400 to 1,000° C. can provide an amorphous target material.

(Electrode Structure)

Figure 2A:
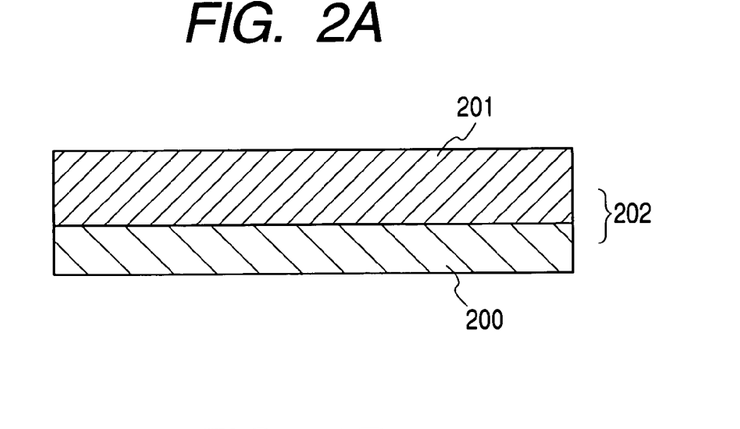
FIGS. 2A, 2B and 2C are conceptional cross sections showing an example of an electrode structure employing an electrode material of the present invention.
Figure 2B:
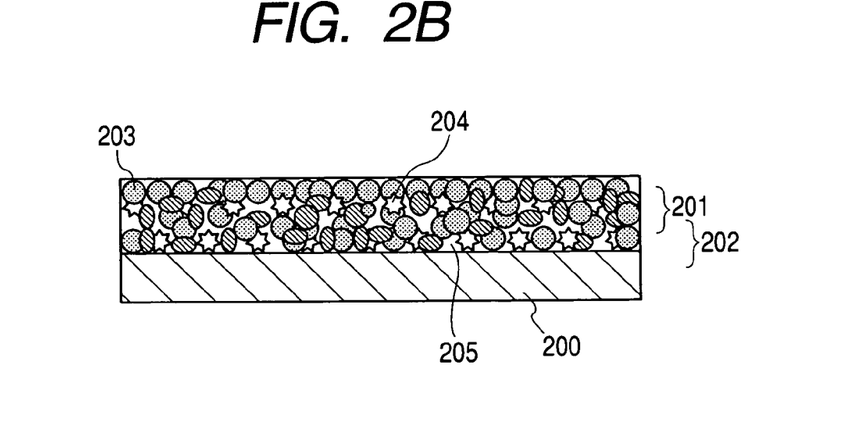
Figure 2C:
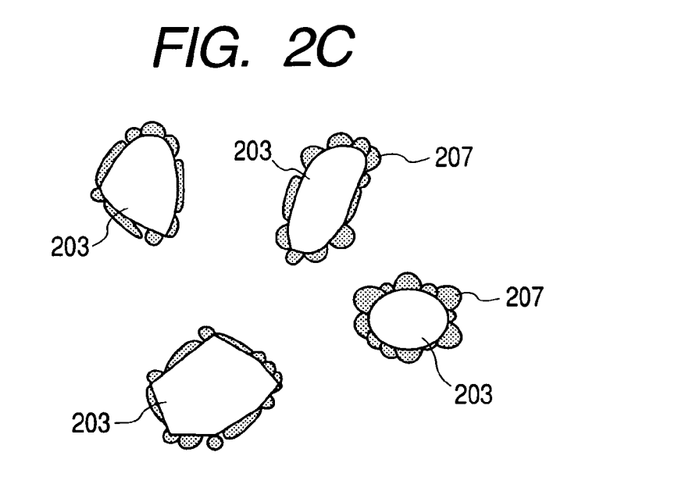

FIGS. 2A to 2C are conceptional cross sections showing an example of an electrode structure composed of the electrode material of the present invention. In FIGS. 2A to 2C, the electrode structure is provided with a current collecting member 200, an electrode material layer 201, an electrode structure 202, an active material (electrode material) 203, a conductive auxiliary material 204, and a binder 205. The electrode structure 202 shown in FIG. 2A has a constitution including the electrode material layer 201 composed of positive electrode material powder provided on the current collecting member 200. The electrode structure 202 shown in FIG. 2B has a constitution including the electrode material layer 201 composed of the positive electrode material powder 203, the conductive auxiliary material 204, and the binder 205 provided on the current collecting member 200. Note that, the electrode material layer 201 is provided on one side of the current collecting member 200 in FIGS. 2A and 2B, but the electrode material layer 201 may be provided on each side of the current collecting layer 200 depending on a shape of a battery. Further, note that, at least a part of a surface of the positive electrode active material 203 may be covered with carbon powder 207 as shown in FIG. 2C. Such covering with the carbon powder 207 enhances the conductivity of the positive electrode active material.

(Preparation of Electrode Structure 202)

The electrode structure 202 can be prepared by: arranging the active material (electrode material powder (positive electrode material powder) of the present invention) 203 on the current collecting member 200; and pressure molding the active material 203 to form the electrode material layer 201. In addition, the electrode structure 202 can be prepared by: mixing the binder 205 and the conductive auxiliary material 204 with the electrode material powder 203; preparing a paste by appropriately adding a solvent to the mixture for adjusting a viscosity of the paste; applying the paste onto the current collecting member 200; and drying the paste to form the electrode material layer 201. At this time, a thickness of the electrode material layer formed is adjusted as required with a roll press or the like. The preparation of the electrode structure is conducted preferably in dry air from which the water content is sufficiently removed, and more preferably in an inert gas atmosphere. Note that, the electrode structure after preparation may be dehydrated through microwave heating or with a vacuum drier.

Hereinafter, the component materials of the electrode structure 202 will be described.

(Conductive Auxiliary Material 204)

The conductive auxiliary material 204 serves to aid electron conductivity and ease current collection because the active material (electrode material powder (positive material powder) of the present invention) 203 substantially has no electron conductivity. Examples of the conductive auxiliary material 204 that can be used include: various carbon materials such as acetylene black, Ketjenblack, and graphite powder; and metallic materials such as nickel, titanium, copper, and stainless steel. The conductive auxiliary material 204 is preferably mixed in a weight ratio of 1 or less with respect to the active material (electrode material powder (positive electrode powder) of the present invention) 203.

(Binder 205)

The binder 205 serves to bond the electrode material powder 203 together and prevent falling of the electrode material powder 203 from the current collecting member 200 caused by formation of cracks during the charging and discharging cycle. Examples of the binder 205 that can be used include one or more kinds of resins selected from the group consisting of a fluorine resin, polyvinylidene fluoride, styrene-butadiene rubber, polyethylene, polypropylene, a silicone resin, and polyvinyl alcohol, which are stable in organic solvents. Note that, the binder 205 is preferably mixed in a ratio of 0.1 or less with respect to the electrode material powder 203.

(Current Collecting Member 200)

Examples of the current collecting member 200 that can be used include fibrous, porous, or mesh aluminum, titanium, nickel, stainless steel, and platinum, which are inactive in a cell reaction.

(Electrode Material Layer 201)

The electrode material layer 201 is a layer basically consisting of the electrode material powder (electrode material powder (positive electrode material powder) of the present invention) 203 and may also be a composite layer containing the electrode material powder, the conductive auxiliary material, a polymer material as the binder, and the like.

The electrode material layer 201 can be formed by: suitably adding the conductive auxiliary material 204 and the binder 205 to the electrode material powder 203 and mixing the whole; applying the obtained mixture on the current collecting member 200; and pressure molding the mixture. The mixture is preferably formed into a paste by adding a solvent to allow easy application. Examples of an application method include a coater application method and a screen printing method. Further, the electrode material layer 201 can also be formed by: mixing the electrode material powder 203, the conductive auxiliary material 204, and the binder 205 without adding a solvent or mixing the positive-electrode material and the conductive auxiliary material without adding the binder; and arranging and pressure molding the mixture on the current collecting member 200.

Figure 3:
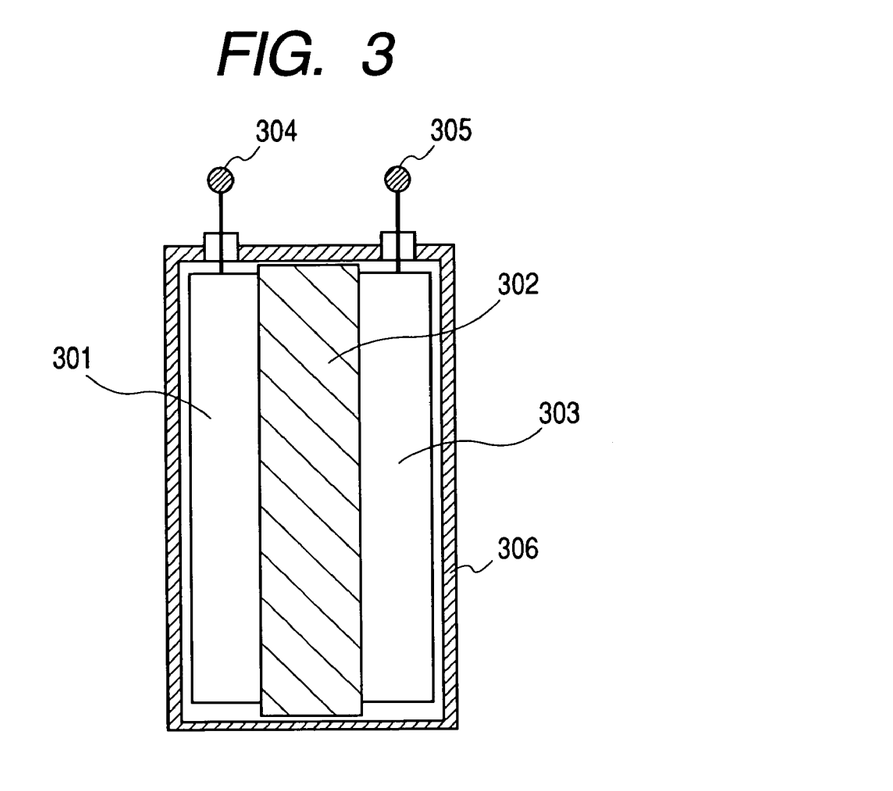
FIG. 3 is a schematic sectional diagram showing a structure of an example of a lithium secondary battery of the present invention.

FIG. 3 is a schematic sectional diagram showing a structure of an example of the lithium secondary battery of the present invention. The lithium secondary battery shown in FIG. 3 is provided with a positive electrode 303 (electrode structure of the present invention described above) and a negative electrode 301 facing each other through an ion conductor 302 (electrolyte), which are held inside a battery housing (case) 306. The negative electrode 301 and the positive electrode 303 are respectively connected to a negative terminal 304 and a positive terminal 305.

Hereinafter, respective component members of the lithium secondary battery of the present invention will be described.

(Positive Electrode 303)

The positive electrode 303 employs the electrode structure 202 of the present invention described above.

(Negative Electrode 301)

The negative electrode 301, a counter electrode of the positive electrode 303, includes at least a negative electrode material (negative electrode active material) which serves as a host material for lithium ions. The negative electrode 301 preferably consists of a layer of the negative electrode material which serves as a host material for lithium ions and a current collecting member. The layer of the negative electrode material preferably consists of the negative electrode material which serves as a host material for lithium ions, the binder, and optionally the conductive auxiliary material.

(Negative Electrode Material)

Examples of the negative electrode material (negative electrode active material) which serves as a host material for lithium ions include one or more kinds of substances selected from the group consisting of carbon, metallic materials electrochemically alloying with lithium, lithium metal, transition metal oxides, transition metal sulfides, transition metal nitrides, lithium-transition metal oxides, lithium-transition metal sulfides, and lithium-transition metal nitrides. Examples of the metallic materials electrochemically alloying with lithium which can be preferably used include metallic materials containing one or more kinds of elements selected from the group consisting of silicon, tin, lithium, magnesium, aluminum, potassium, sodium, calcium, zinc, and lead. Further, examples of the transition metal element of the transition metal oxides, the transition metal sulfides, and the transition metal nitrides include elements each having a partially filled d-shell or f-shell such as Sc, Y, lanthanoids, actinoids, Ti, Zr, Hf, V, Nb, Ta, Cr, Mo, W, Wn, Tc, Re, Fe, Ru, Os, Co, Rh, Ir, Ni, Pd, Pt, Cu, Ag, and Au. The lithium metal is preferably employed for the negative electrode material (negative electrode active material), to thereby obtain a lithium secondary battery having a high energy density.

(Negative Electrode Current Collecting Member)

Examples of the current collecting member employed for the negative electrode include fibrous, porous, or mesh carbon, stainless steel, titanium, nickel, copper, platinum, and gold.

(Ion Conductor 302)

Examples of the ion conductor that can be used for the lithium secondary battery of the present invention include conductors of lithium ions such as a separator holding an electrolytic solution (electrolytic solution prepared by dissolving an electrolyte in a solvent), a solid electrolyte, and a solidified electrolyte prepared by gelling an electrolytic solution using a polymer gel.

The conductivity of the ion conductor of the lithium secondary battery according to the present invention is preferably as high as possible. The conductivity at 25° C. is desirably at least $1 \times 10^{-3}$ S/cm or more, preferably at least $5 \times 10^{-3}$ S/cm or more.

(Electrolyte)

Examples of the electrolyte include: salts of a lithium ion ($Li^+$) and a Louis acid ion ($BF_4^-$, $PF_6^-$, $AsF_6^-$, $ClO_4^-$, $PF_6^-$, $CF_3SO_3^-$, $(CF_3SO_2)_3C^-$, $(CF_3SO_2)_2N^-$, $B(C_6H_5)_4^-$, or $C_4F_9SO_3^-$); and mixtures of those salt. In addition to the above, salts of a cation (sodium ion, potassium ion, tetraalkylammonium ion, or the like) and the Louis acid ion can also be used. The salts are preferably sufficiently dehydrated and deoxidized by heating under reduced pressure or the like. The electrolytic solution is preferably gelled for preventing leaks of the electrolytic solution. A polymer which swells by absorbing the solvent of the electrolytic solution is desirable for a gelling agent, and preferable specific examples of the polymer include polyethylene oxide, polyvinyl alcohol, polyacrylonitrile, and polyvinylidene fluoride.

(Solvent of Electrolyte)

Examples of the solvent of the electrolyte include acetonitrile ($CH_3CN$), benzonitrile ($C_6H_5CN$), propylene carbonate (PC), ethylene carbonate (EC), dimethylformamide (DMF), tetrahydrofuran (THF), nitrobenzene ($C_6H_5NO_2$), dichloroethane, diethoxyethane, chlorobenzene, γ-butyrolactone, dioxolane, sulfolane, nitromethane, dimethylsulfide, dimethylsulfoxide, dimethoxyethane, methyl formate, 3-methyl-2-oxazolidinone, 2-methyltetrahydrofuran, sulfur dioxide, phosphoryl chloride, thionyl chloride, and sulfuryl chloride, and mixtures thereof.

The solvent is preferably used after: dehydrating with activated alumina, molecular sieve, phosphorus pentaoxide, calcium chloride, or the like; or removing impurities and dehydrating by distilling in an inert gas in the presence of an alkali metal depending on the solvent.

A solid electrolyte or solidified electrolyte is preferably used for preventing leaks of the electrolytic solution. Examples of the solid electrolyte include: a glass such as an oxide containing a lithium element, a silicon element, an oxygen element, and a phosphorus element or a sulfur element; and polymer complexes of an organic polymer having an ether structure. The solidified electrolyte is preferably prepared by gelling and solidifying an electrolytic solution using a gelling agent. Examples of the gelling agent desirably used include: polymers which swell by absorbing the solvent of the electrolytic solution; and porous materials which absorb a large volume of liquid such as silica gel.

Examples of the polymers include polyethylene oxide, polyvinyl alcohol, polyacrylonitrile, polymethyl methacrylate, and a vinylidene fluoride-hexafluoropropylene copolymer. Further, the polymers more preferably have a crosslinking structure.

The separator serves to prevent short circuit between the negative electrode and the positive electrode within the lithium secondary battery. Further, the separator may also serve to hold the electrolytic solution.

The separator must have pores allowing transfer of lithium ions and must be insoluble in the electrolytic solution and stable. Therefore, examples of materials suitably used for the separator include: glass; polyolefins such as polypropylene and polyethylene; nonwoven fabrics such as a fluorine resin; and materials having a micropore structure. Further, metal oxide films having fine pores or resin composite films containing metal oxides can also be used.

(Shape and Structure of Battery)

Examples of specific shapes of the lithium secondary battery according to the present invention include a flat-shape, a cylinder, a rectangular parallelepiped, and a sheet. Further, examples of structures of the battery include a single layer-type, a multilayer-type, and a spiral-type. Of those, a spiral-type cylindrical battery has a feature allowing enlargement of an electrode area by rolling the separator sandwiched between the positive electrode and the negative electrode and allowing supply of a high current during charging and discharging. Further, a rectangular parallelepiped or sheet battery has a feature allowing effective utilization of storage space of devices holding a plurality of batteries.

Figure 4:
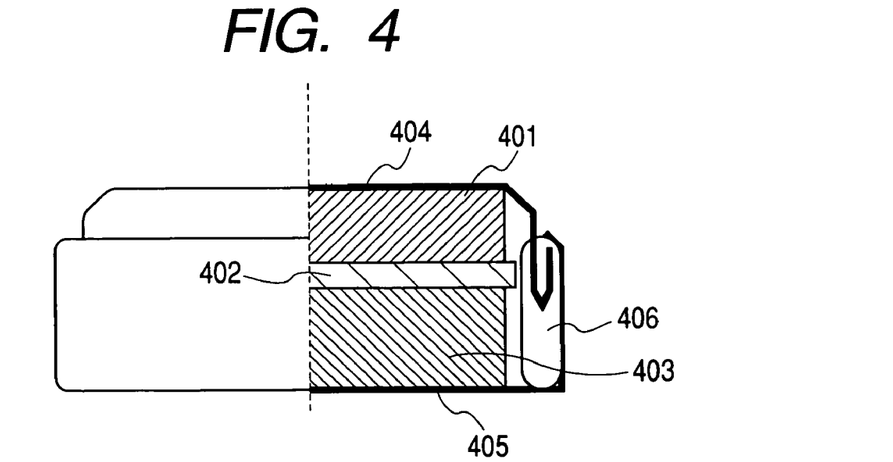
FIG. 4 is a schematic sectional diagram showing a structure of an example of a flat (coin-type) lithium secondary battery.
Figure 5:
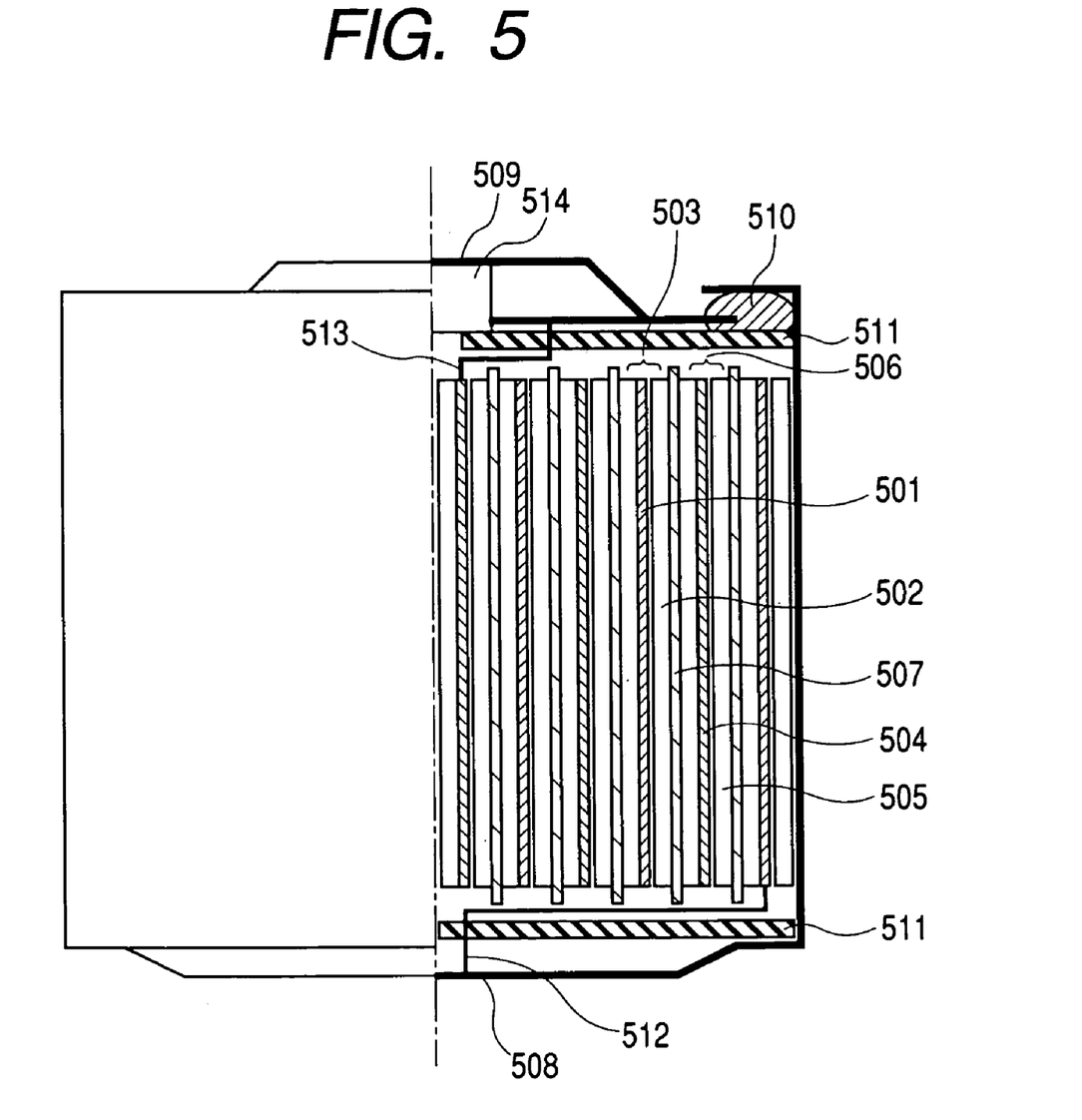
FIG. 5 is a schematic sectional diagram showing a structure of an example of a spiral-type cylindrical lithium secondary battery.

Hereinafter, FIG. 4 is a schematic sectional diagram showing a structure of an example of a flat (coin-type) lithium secondary battery. FIG. 5 is a schematic sectional diagram showing a structure of an example of a spiral-type cylindrical lithium secondary battery. In FIGS. 4 and 5, the batteries are provided with: negative electrodes 401 and 503; positive electrodes 403 and 506; negative terminals (negative electrode cap or negative electrode can) 404 and 508; positive terminals (positive electrode can or positive electrode cap) 405 and 509; ion conductors 402 and 507; gaskets 406 and 510; a negative electrode current collecting member 501; a positive electrode current collecting member 504; an insulating sheet 511; a negative electrode lead 512; a positive electrode lead 513; and a safety valve 514.

(Flat Lithium Secondary Battery)

The flat lithium secondary battery shown in FIG. 4 is provided with the positive electrode 403 having a positive electrode material layer (positive electrode active material layer) and the negative electrode 401 having a negative electrode material layer (negative electrode active material layer) laminated through the ion conductor 402 formed by, for example, a separator holding at least an electrolytic solution. The laminated member is placed inside the positive electrode can 405 as the positive terminal from a positive electrode side, and a negative electrode side is covered with the negative electrode cap 404 as the negative terminal. The gasket 406 is arranged in other portions inside the positive electrode can 405.

(Spiral-type Cylindrical Lithium Secondary Battery)

The spiral-type cylindrical lithium secondary battery shown in FIG. 5 includes: the positive electrode 506 having a positive electrode material layer (positive electrode active material layer) 505 formed on the positive electrode current collecting member 504; and the negative electrode 503 having the negative electrode material layer (negative electrode active material layer) 502 formed on a negative electrode current collecting member 501. The positive electrode 506 and the negative electrode 503 face each other through the ion conductor 507 formed by, for example, a separator holding at least an electrolytic solution and rolled multiple times, to thereby form an electrode laminated member having a cylindrical structure. The electrode laminated member is held inside the negative electrode can 508 as the negative terminal. Further, the positive electrode cap 509 as the positive terminal is provided at a side of an opening portion of the negative electrode can 508, and the gasket 510 is arranged in other portions inside the negative electrode can. Further, the electrode laminated member is separated from a side of the positive electrode cap by the insulating sheet 511. The positive electrode 506 is connected to the positive electrode cap 509 through the positive electrode lead 513. Further, the negative electrode 503 is connected to the negative electrode can 508 through the negative electrode lead 512. The safety valve 514 is provided on the side of the positive electrode cap for adjusting internal pressure of the battery.

Note that, the active material layer of the positive electrode 403 in FIG. 4 and the positive electrode active material layer 505 of the positive electrode 506 in FIG. 5 employs layers consisting of the positive electrode material powder of the present invention described above.

(Assembly of Battery)

Hereinafter, an example of an assembly method for the batteries shown in FIGS. 4 and 5 will be described.

(1) The negative electrode (401 or 503) and the formed positive electrode (403 or 506) sandwiching the separator (401 or 507) are assembled into the positive electrode can (405) or the negative electrode can (508).

(2) The electrolytic solution is poured, and then the negative electrode cap (404) or the positive electrode cap (509) is assembled with the gasket (406 or 510).

(3) The assembly obtained in the above (2) is caulked, to thereby complete the battery.

Note that, the preparation of materials for the lithium battery and the assembly of the battery described above are desirably carried out in dry air from which a water content is sufficiently removed or in a dry inert gas.

Hereinafter, members constituting the lithium secondary battery will be described.

(Gasket)

Examples of the materials that can be used for the gaskets (406 and 510) include a fluorine resin, a polyamide resin, a polysulfone resin, and various kinds of rubbers. Examples of a sealing method of the battery include, in addition to "caulking" with the gasket as in FIGS. 4 and 5, glass sealing, sealing with adhesives, welding, and soldering. Further, various kinds of organic resin materials or ceramics are used as the material for the insulating sheet (511) in FIG. 5.

(Outside Can)

The outside can of the battery consists of the positive electrode can or the negative electrode can (405 or 508) and the negative electrode cap or the positive electrode cap (404 and 509). Stainless steel is suitably used as a material for the outside can. Examples of the particularly frequently used material for the outside can include a titanium clad stainless steel sheet, a copper clad stainless steel sheet, and a nickel plating steel sheet.

The positive electrode can (405) in FIG. 4 and the negative electrode can (508) in FIG. 5 serve as both battery housings (cases) and terminals, and stainless steel is preferably used as the component materials of the cans. However, metals such as zinc, plastics such as polypropylene, or composite materials of metals or glass fibers and plastics as well as stainless steel can be used as the component material for the battery case if the positive electrode can or the negative electrode can does not serve as both the battery housings and the terminal.

(Safety Valve)

The lithium secondary battery is equipped with the safety valve as a safety measure against an increased internal pressure of the battery. Examples of the safety valve that can be used include rubbers, springs, metallic balls, and rupture foils.

The present invention will be more specifically described with reference to the following examples. However, the examples are mere illustrations, and the present invention is not in any way limited by the examples.

EXAMPLE 1

First, an $Li_xB_{0.75}Mn_{0.25}O_2$ model having a monoclinic $LiBO_2$ structure was formulated by selecting a manganese element as an element having a varying valence.

Calculation of Voltage and Capacity:

The voltage and capacity of $Li_xB_{0.75}Mn_{0.25}O_2$ were calculated using first principle density functional theory. $Li_xB_{0.75}Mn_{0.25}O_2$ had an average voltage of 3.6 V (vs. $Li/Li^+$) between x=0.0 and x=1.0, a theoretical capacity of 450 mAh/g at this time, and an energy density of 1.6 Wh/g.

Figure 6:
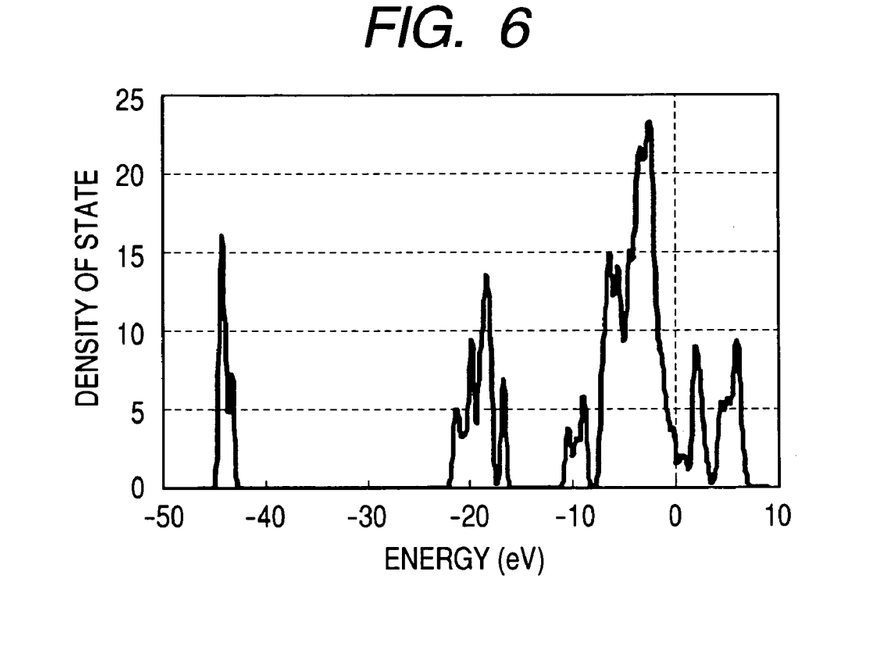
FIG. 6 is a diagram showing density of state in accordance with energy (eV) of the positive electrode active material synthesized in Example 1 calculated using first principle density functional theory at x=1.0.

Density of State:

Density of state (FIG. 6) at x=1.0 was investigated from the results of the first principle density functional theory. FIG. 6 shows no band gap in the vicinity of Fermi energy, thereby implying that $Li_xB_{0.75}Mn_{0.25}O_2$ is a material having high electric conductivity. Here, an origin (0 eV) of energy in FIG. 6 was defined as Fermi energy.

Formation Energy:

A formation energy was −1.91 eV at x=1.0 and −0.83 eV at x=0.0, thereby implying that the model may exist in actuality.

EXAMPLE 2

First, an $Li_xB_{0.75}Co_{0.25}O_2$ model having a monoclinic $LiBO_2$ structure was formulated by selecting a cobalt element as an element having a varying valence.

Calculation of Voltage and Capacity:

The voltage and capacity of $Li_xB_{0.75}Co_{0.25}O_2$ were calculated using the first principle density functional theory. $Li_xB_{0.75}Co_{0.25}O_2$ had an average voltage of 4.3 V (vs. $Li/Li^+$) between x=0.0 and x=1.0, a theoretical capacity of 430 mAh/g at this time, and an energy density of 1.8 Wh/g.

Figure 7:
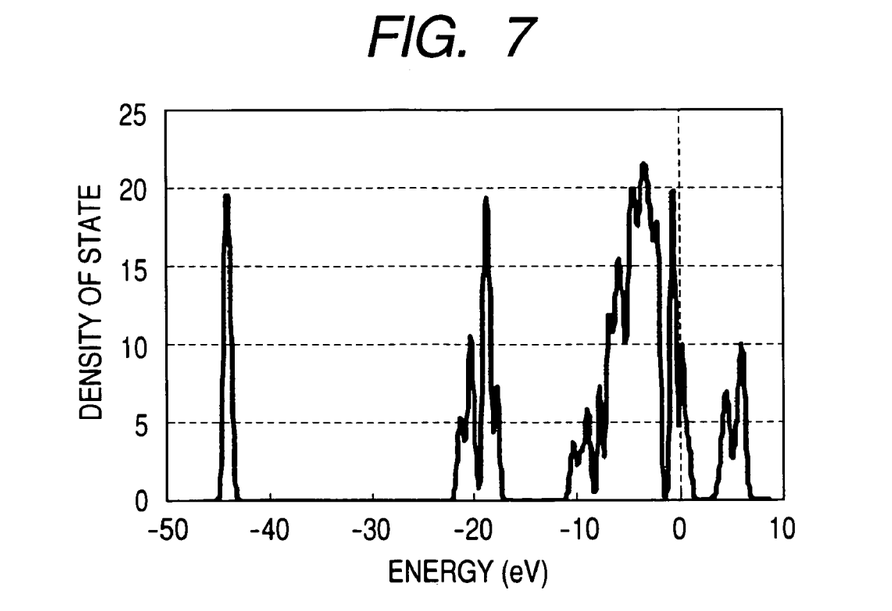
FIG. 7 is a diagram showing density of state in accordance with energy (eV) of the positive electrode active material synthesized in Example 2 calculated using first principle density functional theory at x=1.0.

Density of State:

The density of state (FIG. 7) at x=1.0 was investigated from the results of the first principle density functional theory. FIG. 7 shows no band gap in the vicinity of Fermi energy, thereby implying that $Li_xB_{0.75}Co_{0.25}O_2$ is a material having high electric conductivity. Here, an origin (0 eV) of energy in FIG. 7 was defined as Fermi energy.

Formation Energy:

The formation energy was −15.3 eV at x=1.0 and −14.2 eV at x=0.0, thereby implying that the model may exist in actuality.

EXAMPLE 3

1. Synthesis of $LiB_{0.75}Mn_{0.25}O_2$

Lithium citrate, boric acid, and manganese nitrate were weighed so that Li/(B+Mn)=1.0 (atomic ratio) and B/Mn=75/25 (atomic ratio). The weighed chemicals were dissolved in an aqueous solution of citric acid at concentration of 20 wt %. The mixture was spray dried using a spray drier, to thereby synthesize a precursor. The precursor was calcined in an oxygen atmosphere (3 l/min) at 750° C. for 12 hours, to thereby synthesize $LiB_{0.75}Mn_{0.25}O_2$, the positive electrode active material.

2. Analysis of the Synthesized Positive Electrode Active Material

XRD Analysis:

Peaks of an X-ray diffraction pattern of the positive electrode active material powder synthesized in the above 1 confirmed that $LiB_{0.75}Mn_{0.25}O_2$ has a single crystal structure of a monoclinic $LiBO_2$ structure.

XMA Analysis:

Elements of Li, B, Mn, and O were identified through X-ray microanalyzer analysis. ICP:

Atomic absorption plasma emission spectrometry confirmed that $LiB_{0.75}Mn_{0.25}O_2$ has an atomic ratio of Li:B:Mn=1.0:0.74:0.26.

3. Production of lithium battery

A lithium battery having a structure shown in FIG. 3 was produced as follows.

(1) Production of Positive Electrode 303

The positive electrode active material powder synthesized in the above 1, acetylene black, and polytetrafluoroethylene powder were mixed in a weight ratio of 80:16:4. n-methyl-2-pyrrolidone was added to the mixture and the whole was sufficiently kneaded, to thereby prepare slurry. The slurry was uniformly applied to one side of an aluminum foil (thickness of 30 μm) as a positive electrode current collecting member, dried, and then pressure molded using a roll pressing machine, to thereby obtain a sheet electrode. The sheet electrode was punched out into a disc having a diameter of 5 mm and dried at 80° C. for 3 hours inside a vacuum drier, to thereby produce the positive electrode 303.

(2) Production of Negative Electrode 301

A metallic lithium foil having a thickness of 0.5 mm was contact pressed on a rolled copper foil as a negative electrode current collecting member having a thickness of 30 μm, and the resultant was punched out into a disc having a diameter of 5 mm, to thereby produce the negative electrode 301.

(3) Ion Conductor 302

A separator holding an electrolytic solution (electrolytic solution prepared by dissolving an electrolyte in a solvent) was used as the ion conductor 302. The electrolytic solution contained 1 M (mol/l) of lithium tetrafluoroborate as an electrolyte dissolved in an equivalently mixed solvent of ethylene carbonate (EC) and dimethyl carbonate (DMC). The separator employed a polypropylene microporous separator sandwiched by a polypropylene nonwoven fabric.

(4) Assembly of Battery

The ion conductor 302 prepared in the above (3) was sandwiched between the negative electrode 301 produced in the above (1) and the positive electrode 303 produced in the above (2), and the whole was inserted in the positive electrode can 305 of a titanium clad stainless steel material. After the electrolytic solution had been poured, the battery was sealed with the negative electrode cap 304 of a titanium clad stainless steel material and the gasket 306 of fluorine rubber, to thereby produce the lithium secondary battery.

(Evaluation of Battery Performance)

A constant current charging and discharging test in addition to a charging and discharging cycle test of the obtained lithium secondary battery was carried out to evaluate the lithium secondary battery for capacity per unit weight and for energy density per unit weight. Note that, the constant current charging and discharging test involved: charging the battery to a cut off voltage of 4.5 V at a charging current density of 0.2 mA/cm$^2$; and discharging the battery to a cut off voltage of 2.5 V at a discharging current density of 0.2 mA/cm$^2$. The results are shown in Table 1.

EXAMPLE 4

A lithium secondary battery was produced in the same way as in Example 3 except that the positive electrode active material was synthesized as follows. The obtained lithium secondary battery was evaluated in the same manner as in Example 3, and the results are shown in Table 1.

Synthesis of $LiB_{0.75}Co_{0.25}O_2$:

Lithium carbonate ($Li_2CO_3$), lithium methaborate ($LiBO_2$), and cobalt tetraoxide ($Co_3O_4$) were weighed so that Li/(B+Co)=1.0 (atomic ratio) and B/Co=75/25 (atomic ratio). The weighed chemicals were sufficiently mixed using a ball mill to form an amorphous mixture, and the mixture was calcined in an oxygen atmosphere (3 l/min) at 900° C. for 12 hours, to thereby synthesize $LiB_{0.75}Co_{0.25}O_2$, the positive electrode active material.

EXAMPLE 5

A lithium secondary battery was produced in the same way as in Example 3 except that the positive electrode active material was synthesized as follows. The obtained lithium secondary battery was evaluated in the same manner as in Example 3, and the results are shown in Table 1.

Synthesis of $LiB_{0.75}Mn_{0.25}O_{1.95}F_{0.05}$:

Lithium carbonate ($Li_2CO_3$), lithium fluoride (LiF), boric acid ($H_3BO_3$), and manganese dioxide ($MnO_2$) were weighed so that Li/(B+Mn)=1.0 (atomic ratio), B/Co=75/25 (atomic ratio), and Li/F=100/5. The weighed chemicals were sufficiently mixed using a ball mill and calcined in an oxygen atmosphere (3 l/min) at 900° C. for 12 hours, to thereby synthesize $LiB_{0.75}Mn_{0.25}O_{1.95}F_{0.05}$, the positive electrode active material.

Comparative Example 1

A lithium secondary battery was produced in the same way as in Example 3 except that the positive electrode active material was synthesized as follows. The obtained lithium secondary battery was evaluated in the same manner as in Example 3, and the results are shown in Table 1.

Synthesis of $LiCoO_2$:

Lithium citrate and cobalt nitrate were weighed so that Li/Co=1.0 (atomic ratio). The weighed chemicals were dissolved in an aqueous solution of citric acid at concentration of 20 wt %. The mixture was spray dried using a spray drier, to thereby synthesize a precursor. The precursor was calcined in an oxygen atmosphere (3 l/min) at 850° C. for 12 hours, to thereby synthesize $LiCoO_2$, the positive electrode active material.

Comparative Example 2

A lithium secondary battery was produced in the same way as in Example 3 except that the positive electrode active material was synthesized as follows. The obtained lithium secondary battery was evaluated in the same manner as in Example 3, and the results are shown in Table 1.

Synthesis of $LiNiO_2$:

Lithium citrate and nickel nitrate were weighed so that Li/Ni=1.06 (atomic ratio). The weighed chemicals were dissolved in an aqueous solution of citric acid at concentration of 20 wt %. The mixture was spray dried using a spray drier, to thereby synthesize a precursor. The precursor was calcined in an oxygen atmosphere (3 l/min) at 750° C. for 12 hours, to thereby synthesize $LiNiO_2$, the positive electrode active material.

Comparative Example 3

A lithium secondary battery was produced in the same way as in Example 3 except that the positive electrode active material was synthesized as follows. The obtained lithium secondary battery was evaluated in the same manner as in Example 3, and the results are shown in Table 1.

Synthesis of $LiMn_2O_4$:

Lithium citrate and manganese nitrate were weighed so that Li/Mn=1.0/2.0 (atomic ratio). The weighed chemicals were dissolved in an aqueous solution of citric acid at concentration of 20 wt %. The mixture was spray dried using a spray drier, to thereby synthesize a precursor. The precursor was calcined in an oxygen atmosphere (3 l/min) at 750° C. for 12 hours, to thereby synthesize $LiMn_2O_4$, the positive electrode active material.

TABLE 1

| | | | Ratio of capacity per unit weight with respect to that of Comparative Example 1 | Ratio of energy density per unit weight with respect to that of Comparative Example 1 |
|---|---|---|---|---|
| Example | 3 | $LiB_{0.75}Mn_{0.25}O_2$ | 1.56 | 1.64 |
| | 4 | $LiB_{0.75}Co_{0.25}O_2$ | 1.38 | 1.41 |
| | 5 | $LiB_{0.75}Mn_{0.25}O_{1.95}F_{0.05}$ | 1.50 | 1.63 |
| Comparative Example | 1 | $LiCoO_2$ | 1.00 | 1.00 |
| | 2 | $LiNiO_2$ | 1.13 | 1.04 |
| | 3 | $LiMn_2O_4$ | 0.88 | 0.90 |

The results in Table 1 show that the positive electrode active material of the present invention has significantly better usable capacity and energy density compared to those of the conventional positive electrode active material.

As described above, the electrode material (positive electrode active material) provided in suitable examples of the present invention has a voltage of 3.0 V (vs. Li/Li$^+$) or more, a usable capacity exceeding 200 mAh/g, and a high energy density. Accordingly, the lithium secondary battery produced by employing the electrode material as the positive electrode has a high capacity and a high energy density.

What is claimed is:

1. An electrode material for a lithium secondary battery comprising lithium boron mixed oxide having a monoclinic LiBO$_2$ structure and represented by a chemical formula LiB$_{1-x}$D$_x$O$_{2-y}$E$_y$ (wherein D represents a substitution element of boron B, E represents a substitution element of oxygen O, 0<x<0.5, and 0<y<0.1), wherein the element E is one or more kinds of elements selected from the group consisting of non-metal elements of Group 15, non-metal elements of Group 16, and halogens of Group 17 in the periodic table.

2. The electrode material for a lithium secondary battery according to claim 1, wherein the element D is one or more kinds of elements selected from the group consisting of transition metal elements, Al, and Si.

3. The electrode material for a lithium secondary battery according to claim 1, wherein the element D is one or more kinds of elements selected from the group consisting of Ti, Zr, V, Nb, Cr, Mo, W, Mn, Fe, Co, Ni, Pd, Pt, Cu, Ag, Au, Zn, Al, and Si.

4. The electrode material for a lithium secondary battery according to claim 1, wherein the element E is one or more kinds of elements selected from the group consisting of N, F, P, S, Cl, As, Se, Br, Te, and I.

5. An electrode structure comprising an electrode material for a lithium secondary battery, wherein the electrode material comprises lithium boron mixed oxide having a monoclinic LiBO$_2$ structure and represented by a chemical formula LiB$_{1-x}$D$_x$O$_{2-y}$E$_y$ (wherein D represents a substitution element of boron B, E represents a substitution element of oxygen O 0<x<0.5, and 0<y<0.1), wherein the element E is one or more kinds of elements selected from the group consisting of non-metal elements of Group 15, non-metal elements of Group 16, and halogens of Group 17 in the periodic table.

6. The electrode structure according to claim 5, wherein the element D is one or more kinds of elements selected from the group consisting of transition metal elements, Al, and Si.

7. The electrode structure according to claim 5, wherein the element D is one or more kinds of elements selected from the group consisting of Ti, Zr, V, Nb, Cr, Mo, W, Mn, Fe, Co, Ni, Pd, Pt, Cu, Ag, Au, Zn, Al, and Si.

8. The electrode structure according to claim 5, wherein the element E is one or more kinds of elements selected from the group consisting of N, F, P, S, Cl, As, Se, Br, Te, and I.

9. A lithium secondary battery comprising a positive electrode, a negative electrode, and an electrolyte, wherein the positive electrode comprises an electrode structure employing an electrode material which comprises lithium boron mixed oxide having a monoclinic LiBO$_2$ structure and represented by a chemical formula LiB$_{1-x}$D$_x$O$_{2-y}$E$_y$ (wherein D represents a substitution element of boron B, E represents a substitution element of oxygen O, 0<x<0.5, and 0<y<0.1), wherein the element E is one or more kinds of elements selected from the group consisting of non-metal elements Group 15, non-metal elements of Group 16, and halogens of Group 17 in the periodic table.

10. The lithium secondary battery according to claim 9, wherein the element D is one or more kinds of elements selected from the group consisting of transition metal elements, Al, and Si.

11. The lithium secondary battery according to claim 9, wherein the element D is one or more kinds of elements selected from the group consisting of Ti, Zr, V, Nb, Cr, Mo, W, Mn, Fe, Co, Ni, Pd, Pt, Cu, Ag, Au, Zn, Al, and Si.

12. The lithium secondary battery according to claim 9, wherein the element E is one or more kinds of elements selected from the group consisting of N, F, P, S, Cl, As, Se, Br, Te, and I.

* * * * *

UNITED STATES PATENT AND TRADEMARK OFFICE
CERTIFICATE OF CORRECTION

PATENT NO. : 7,378,189 B2  Page 1 of 1
APPLICATION NO. : 10/851069
DATED : May 27, 2008
INVENTOR(S) : Hagiwara et al.

It is certified that error appears in the above-identified patent and that said Letters Patent is hereby corrected as shown below:

COVER PAGE:
    Abstract, Line 13, "second" should read -- secondary --.

COLUMN 7:
    Line 31, "include" should read -- includes --.

COLUMN 9:
    Line 13, "positive-electrode" should read -- positive electrode --.

COLUMN 10:
    Line 25, "$AsF_6^-,$" should read -- $AsF_6^-,$ --; and
    Line 27, "salt." should read -- salts. --.

COLUMN 14:
    Line 29, "ICP:" should begin a new paragraph.

COLUMN 17:
    Line 34, "$LiB_{1x}D_xO_{2-y}E_y$" should read -- $LiB_{1-x}D_xO_{2-y}E_y$ --; and
    Line 36, "O0<x<0.5," should read -- O, 0<x<0.5, --.

COLUMN 18:
    Line 18, "$LiB_{1-}$" should be deleted;
    Line 19, "$_xD_xO_{2-y}E_y$" should read -- $LiB_{1-x}D_xO_{2-y}E_y$ --; and
    Line 24, "ments" should read -- ments of --.

Signed and Sealed this

Eleventh Day of November, 2008

JON W. DUDAS
*Director of the United States Patent and Trademark Office*